United States Patent [19]
Setani

[11] Patent Number: 5,471,321
[45] Date of Patent: Nov. 28, 1995

[54] COLOR IMAGE READING DEVICE

[75] Inventor: Michitaka Setani, Kawasaki, Japan

[73] Assignee: Canon Kabushiki Kaisha, Tokyo, Japan

[21] Appl. No.: 934,213

[22] Filed: Aug. 25, 1992

[30] Foreign Application Priority Data

Aug. 28, 1991 [JP] Japan ................... 3-242644

[51] Int. Cl.$^6$ ................... G02B 27/00
[52] U.S. Cl. ............ 358/474; 358/514; 356/328
[58] Field of Search ............ 358/474; 356/325, 356/302, 152, 318, 328, 197, 334, 320, 333, 73, 326, 141, 316; 250/208.1, 237 G, 226; 343/753; 359/197, 858, 563, 577, 571

[56] References Cited

U.S. PATENT DOCUMENTS

| | | | |
|---|---|---|---|
| 4,079,382 | 3/1978 | Henry | 343/753 |
| 4,664,522 | 5/1987 | LeFebre | 356/328 |
| 4,682,888 | 7/1987 | Welner | 356/73 |
| 4,697,924 | 10/1987 | Akiyama | 356/333 |
| 4,795,256 | 1/1989 | Krause et al. | 356/320 |
| 4,998,806 | 3/1991 | Tsuji et al. | 350/413 |
| 5,113,067 | 5/1992 | Nakai et al. | 250/208.1 |
| 5,148,038 | 9/1992 | Nose et al. | 250/548 |
| 5,161,045 | 11/1992 | Hutchi | 359/197 |
| 5,173,599 | 12/1992 | Setani | 250/208.1 |
| 5,192,981 | 3/1993 | Slutter et al. | 356/334 |
| 5,274,435 | 12/1993 | Hettrick | 356/328 |
| 5,285,255 | 2/1994 | Baranne et al. | 356/328 |
| 5,361,145 | 11/1994 | Hasegawa | 358/514 |

Primary Examiner—Paul Ip
Attorney, Agent, or Firm—Fitzpatrick, Cella, Harper & Scinto

[57] ABSTRACT

A color image reading apparatus is provided with a line sensor, an imaging optical system and a blazed diffraction grating. A color image is read by the line sensor through a rotatable reflective one-dimensional blazed diffraction grating serving as the color separation means. At least three color lights color-separated by the diffraction grating is synchronized with the scanning reading speed to rotate the diffraction grating in at least three directions, so that the reading of the color image is conducted by use of one line sensor.

18 Claims, 6 Drawing Sheets

(MAIN SCANNING SECTION)

(SUB-SCANNING SECTION)

(SUB-SCANNING SECTION)

FIG. 1
PRIOR ART (SUB-SCANNING SECTION)

(MAIN SCANNING SECTION)

FIG. 5A (SUB-SCANNING SECTION)

COLOR IMAGE READING DEVICE

BACKGROUND OF THE INVENTION

1. Field of the Invention

The present invention relates to a color image reading device, and more particularly to a color image reading device capable of precisely reading color image information on an original image, utilizing color separation means consisting of a one-dimensional blazed diffraction grating rotatable in the sub scanning direction and photosensor means including a line sensor, and adapted for use in a color scanner, a color facsimile or the like.

2. Related Background Art

There have already been proposed various devices in which color image information on an original image is focused through an optical system onto a line sensor (CCD), and is read in digital manner by the output signal from said line sensor.

Figure 1:
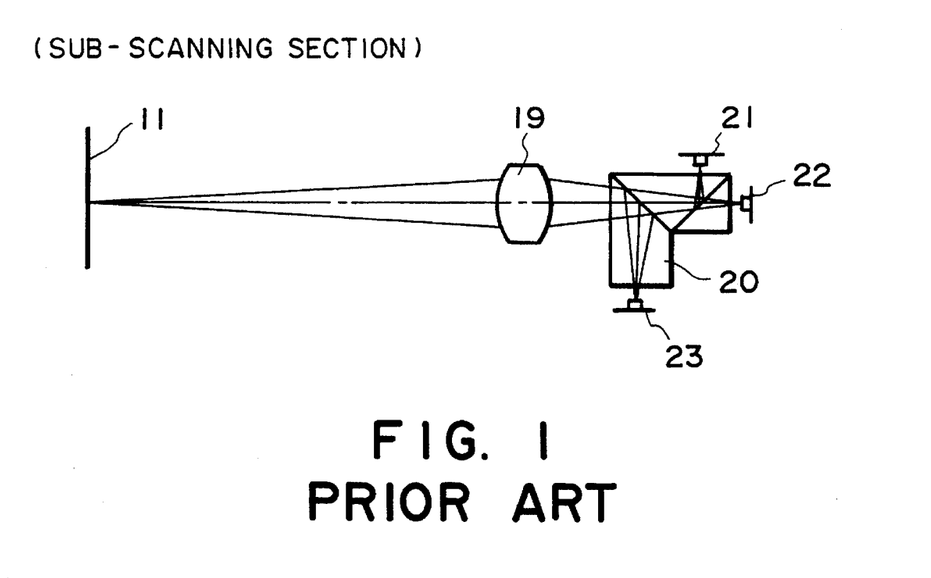
FIGS. 1 and 2 are partial schematic views of the optical system of conventional color image reading devices.

As an example, FIG. 1 schematically illustrates the optical system of a conventional color image reading device. The light from a color image on an original 11 is condensed by an imaging lens 19, then separated by a prism 20 into three colors for example of red (R), green (G) and blue (B), and guided to respective line sensors 21, 22, 23 to be explained later. The color images focused on the line sensors 21, 22, 23 are line scanned in the sub scanning direction, whereby the image reading is conducted for each color.

Figure 2:
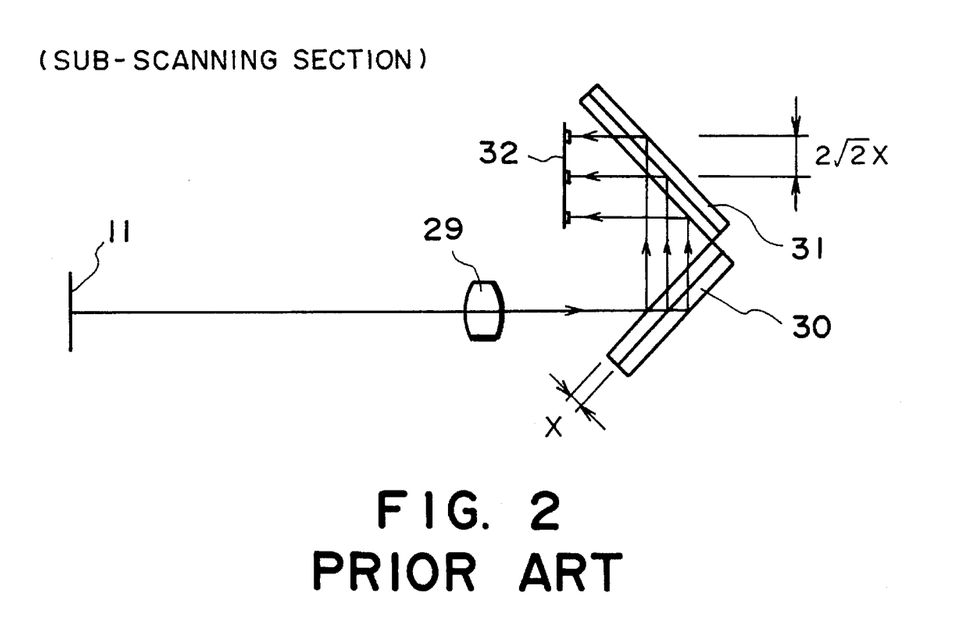

Also FIG. 2 illustrates schematically the optical system of a conventional color image reading device. In this case the light from a color image on an original 11 is condensed by an imaging lens 29, and is guided through two color separating beam splitters 30, 31, each provided with a dichroic wavelength selecting transmissive film, thereby being separated into three lights corresponding to three colors.

Images of three colors are then focused on three line sensors on so-called monolithic 3-line sensor 32 in which said three line sensors are formed on a same substrate, and said images are line scanned in the sub scanning direction whereby the image reading is conducted for each color.

Figure 3:
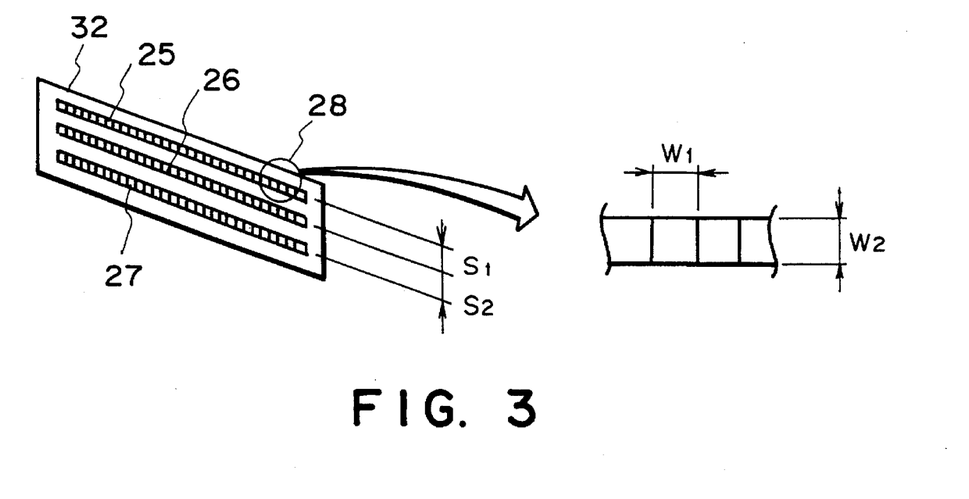
FIG. 3 is a schematic view of a monolithic 3-line sensor.

FIG. 3 is a schematic view of the monolithic 3-line sensor 32 shown in FIG. 2. In said sensor 32, three line sensors (CCD) 25, 26, 27 are formed in mutually parallel manner on a same substrate, with a certain distance therebetween, and each line sensor is provided thereon with an unrepresented color filter corresponding to the respective color of the image.

The distances S1, S2 of the line sensors 25, 26, 27 are generally in a range of 0.1 to 0.2 mm in consideration of various manufacturing conditions, and each pixel size W1, W2 of individual element 28 is selected, for example, as 7×7 μm or 10×10 μm.

The color image reading device shown in FIG. 1 requires three independent line sensors, and becomes complex and expensive in the configuration since there is required a 3P prisms which necessitates a high precision and is difficult to manufacture. Also the adjustment at assembly is complicated since the alignment between the focused light and the line sensor has to be made independently for each color.

In the color image reading device shown in FIG. 2, the distance of the neighboring line sensors is $2\sqrt{2}X$ wherein X is the thickness of the beam splitter 30 or 31. If the line distance preferred for manufacture is in the order of 0.1 to 0.2 mm, the thickness X of the beam splitters will be in the order of 35 to 70 μm.

It is generally very difficult to construct a beam splitter of satisfactory optical flatness with such a small thickness, and the optical performance of the color image focused on the line sensor is inevitably deteriorated if the beam splitter of such small thickness is employed.

Figure 4:
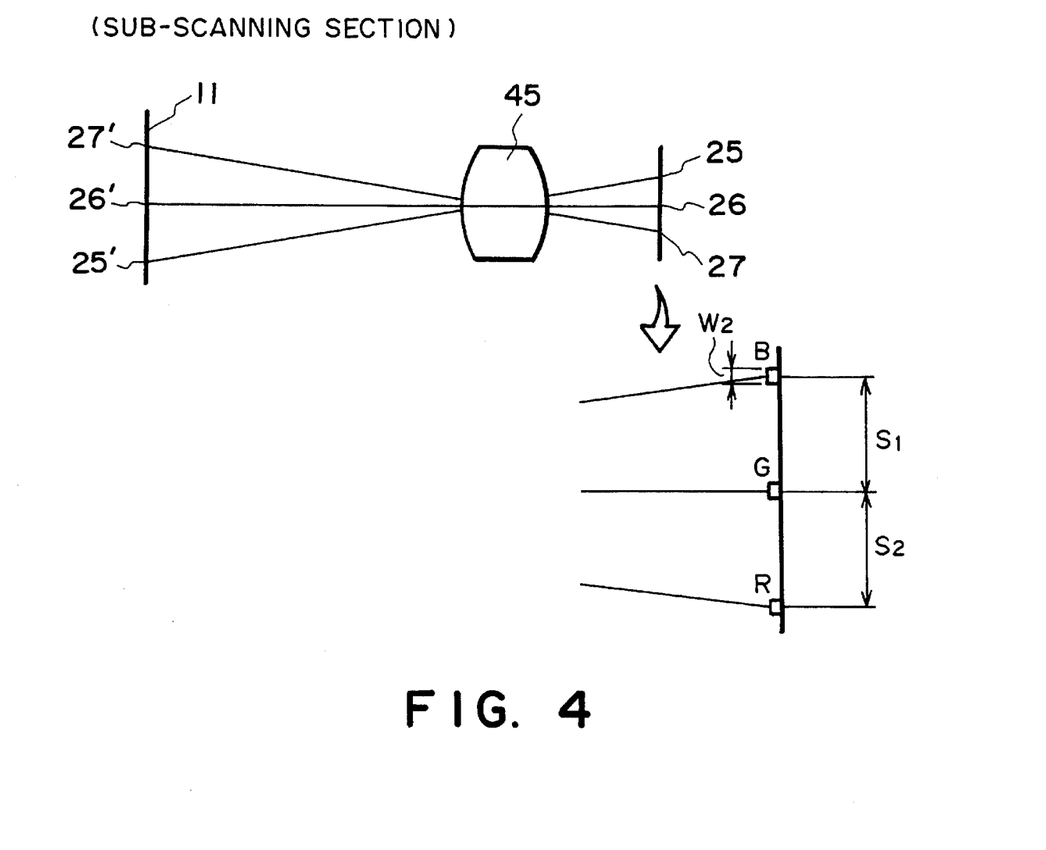
FIG. 4 is a partial schematic view of the optical system of a conventional color image reading device.

On the other hand, in a monolithic 3-line sensor as shown in FIG. 4, the distances S1, S2 of two lines 25, 27 from the central line 26 are generally selected mutually equal, and as an integral multiple of the pixel size W2 in the sub scanning direction, because of the following reasons.

In case of reading a color image with the above-mentioned monolithic 3-line color sensor in combination with an ordinary imaging optical system 45 as shown in FIG. 4, the three line sensors 25, 26, 27 simultaneously read three different positions 25', 26', 27' on the original image 11.

Stated differently, the signal components of three colors R, G, B on an arbitrary position on the original image 11 cannot be read at the same time, but have to be synchronized after reading with three line sensors and synthesized.

The synthesized signal of three color components can be relatively easily obtained by selecting the distances S1, S2 of the three line sensors as integral multiples of the pixel size W2, providing redundant line memories corresponding to said distances and delaying, for example, the G and R signals corresponding to the green and red lights with respect to the B signal corresponding to the blue light.

For this reason the distances S1, S2 of the line sensors 25, 27 from the central sensor 26 are selected as integral multiples of the pixel size in the sub scanning direction.

However, in such color image reading device, the use of plural line memories corresponding to the distances of three line sensors is extremely costly and leads to the complication of the entire device.

Also the conventional color image reading device has been associated with the drawback of high cost as it has employed three line sensors as the photosensor means.

SUMMARY OF THE INVENTION

The object of the present invention is to provide a color image reading device capable of reading a color image in highly precise digital manner with three color components for example of R, G and B, by employing a rotatable reflective one-dimensional blazed diffraction grating as the color separation means and rotating said diffraction grating in at least three directions, in reading the color image with color separation into at least three colors, in synchronization with the image scanning speed, thereby leading the separated colored lights in succession to photosensor means consisting of a line sensor.

The color image reading device of the present invention is designed to focus a color image on photosensor means having a line sensor through an imaging optical system and reading said color image by said photosensor means, and is featured by facts that color separation means consisting of a rotatable reflective blazed one-dimensional diffraction grating capable of separating the incident light into at least three colored lights is positioned in the optical path between said imaging optical system and said photosensor means and that said one-dimensional diffraction grating is rotated with respect to the optical axis in synchronization with the image scanning speed thereby leading the image information of said three colored lights in succession to said line sensor and thus reading the colored images in succession.

DETAILED DESCRIPTION OF THE PREFERRED EMBODIMENTS

Figure 5A:
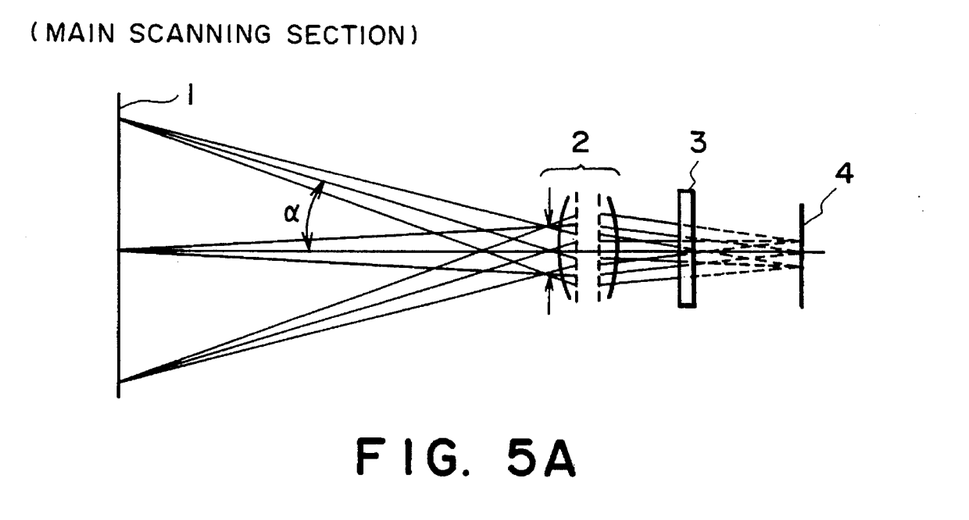
FIGS. 5A and 5B are respectively a partial plan view and a partial lateral view of a first embodiment of the present invention.
Figure 5B:
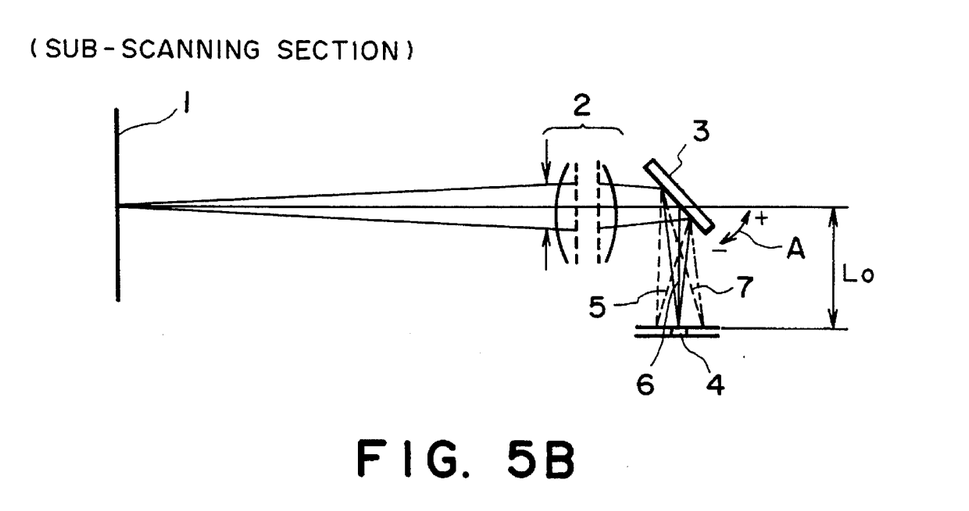

FIGS. 5A and 5B are respectively a partial plan view along the main scanning plane and a partial lateral view along the sub scanning section, containing the optical axis and perpendicular to the main scanning plane, of a first embodiment of the present invention.

Referring to FIGS. 5A and 5B, the image information of an original image 1 is read in succession, by a relative movement of said original image 1 and a color image reading device (an imaging optical system 2, a diffraction grating 3 and a photosensor means 4) in the sub scanning direction.

Figure 6A:
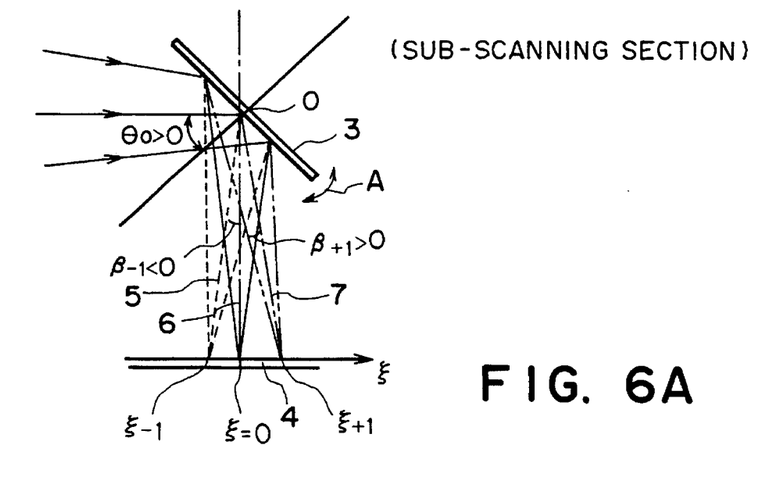
FIGS. 6A, 6B and 6C are schematic views showing the optical path after passing through the imaging optical system shown in FIGS. 5A and 5B, in combination with the rotation of the reflective one-dimensional blazed diffraction grating.
Figure 6B:
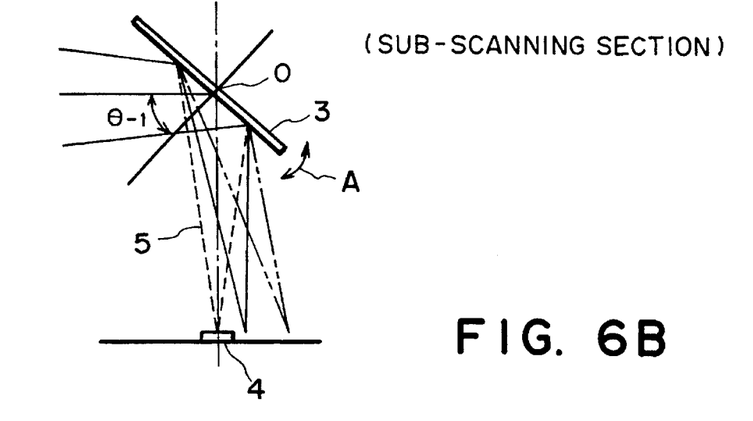
Figure 6C:
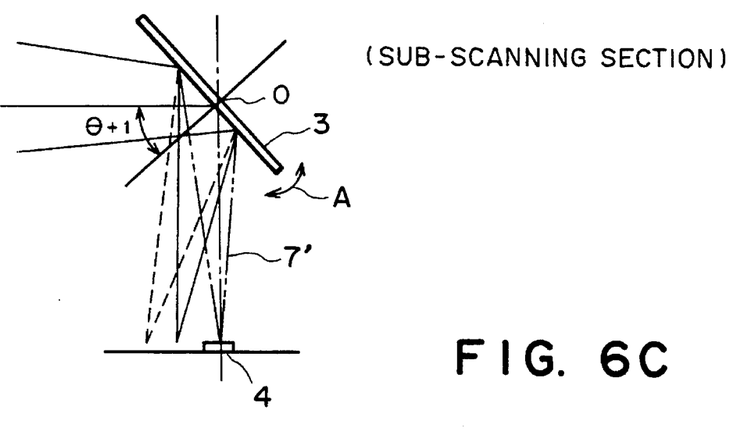

FIGS. 6A, 6B and 6C are partial schematic views of the optical path after passing through the imaging optical system shown in FIGS. 5A and 5B, showing the mode of leading the different colored lights to the photosensor means by the rotation of the reflective one-dimensional blazed diffraction grating.

More specifically, FIG. 6A illustrates the optical path when said diffraction grating is in a reference (initial) position, while FIGS. 6B and 6C respectively show states in which said diffraction grating is rotated, anticlockwise or clockwise, by a predetermined amount.

In these drawings, an original image 1 bears a color image. An imaging optical system 2 is constructed, in the present embodiment, as a so-called exit telecentric system which emits the principal ray at the exit side parallel to the optical axis, and serves to focus the light from said color image onto the photosensor means, including a line sensor, through a reflective one-dimensional blazed diffraction grating to be explained later.

Color separation means 3 is composed of a reflective one-dimensional blazed diffraction grating rotatable in a direction perpendicular to the direction of array of the pixels of the line sensor, namely in the sub scanning direction (in the sub scanning section), and serves to separate the incident light, by reflective diffraction, into predetermined colored lights, for example, of red (R), green (G) and blue (B), in the sub scanning direction.

In the present embodiment, said reflective one-dimensional blazed diffraction grating is rotated in at least three directions in the sub scanning section, in synchronization with the scanning speed, whereby the colored lights separated by said diffraction grating are lead in succession to photosensor means 4 having a line sensor on a substrate.

In the present embodiment, a color image on the original 1 is line scanned by scanning means, composed of an unrepresented mirror etc. positioned between the original image 1 and the imaging optical system, and the light from said color image is condensed by the imaging optical system and separated into three colored lights by the one-dimensional blazed diffraction grating 3. Said colored lights are in succession focused on the photosensor means (a line sensor) 4 by rotation of said diffraction grating by a predetermined amount, as indicated by an arrow A, in synchronization with the image scanning speed.

Thus the photosensor means reads, in digital manner, the color images corresponding to said colored lights, in succession.

The reflective one-dimensional blazed diffraction grating 3, employed for color separation in the present embodiment, separates the reflected and diffracted lights into three directions of a −1st order light 5, a 0-th order light 6 and a +1st order light 7, and focuses said lights on different positions on the photosensor means 4.

The reflected diffraction angles $\theta+\beta_{-1}$, $\theta+\beta_{+1}$ in the ±1st order diffractions in the reflected diffraction are correlated with the incident angle $\theta$ by the following equations:

$$\sin(\theta+\beta_{-1}) - \sin\theta = -\lambda/P \quad (-1\text{st order})$$

$$\sin(\theta+\beta_{+1}) - \sin\theta = +\lambda/P \quad (+1\text{st order})$$

Consequently the separation angles $\beta_{\pm 1}$ of the ±1st order diffraction lights with respect to the direction of the 0-th order diffraction light can be determined from:

$$\beta_{-1} = \sin^{-1}(\sin\theta - \lambda/P) - \theta$$

$$\beta_{+1} = \sin^{-1}(\sin\theta + \lambda/P) - \theta \quad (1)$$

Figure 7:
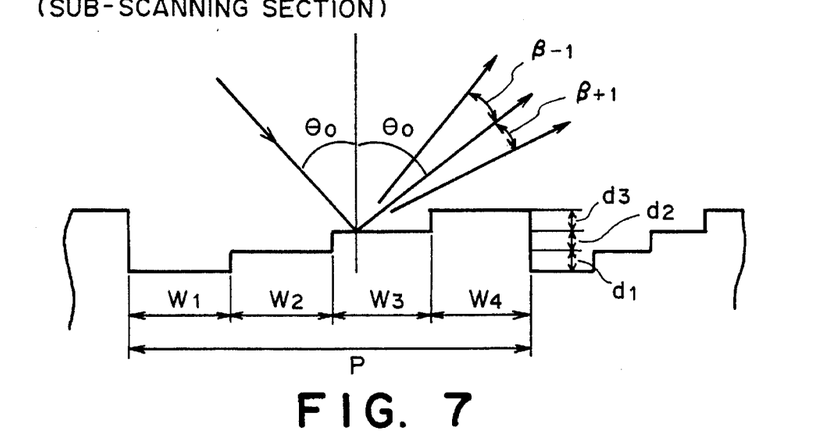
FIG. 7 is a view showing the structure of the reflective plane of the reflective one-dimensional blazed diffraction grating.

FIG. 7 illustrates an example of the structure of the reflection surface of the reflective one-dimensional blazed diffraction grating employed in the present invention. Said reflection surface is composed of a stepwise grating as disclosed in Applied Optics, 17, No. 15, pp. 2273–2279 (Aug. 1, 1978). The parameters in such reflective diffraction grating are, for example the grating thickness $d_1=d_2=d_3=749.5$ nm; the step width $W_1=W_2=W_3=W_4$; and the pitch P is represented by:

$$P = \sum_{\lambda=1}^{4} W_i$$

For an incident angle $\theta_0=45°$, the effective peak wavelength $\lambda$ for the ±1st order light can be determined from:

$$2d\cdot\cos\theta_0 \cong (m \mp 1/n)\cdot\lambda_{\pm 1} \quad (2)$$

as $\lambda_{+1} \cong 606$ nm and $\lambda_{-1} \cong 471$ nm for $(n, m)=(4, 2)$, and that for the 0-th order light can be determined from:

$$2d\cdot\cos\theta_0 \cong m\cdot\lambda_0 \quad (3)$$

as $\lambda_0 = 530$ nm.

Also the separation angles $\beta_{\pm 1}$ of the ±1st order lights for a grating pitch P=0.16 mm can be determined, according to the equations (1), as:

$$\beta_{+1}=0.308 \text{ deg}, \beta_{-1}=-0.238 \text{ deg}.$$

For a distance $L_0$ from the diffraction grating surface to the line sensor surface on the photosensor means 4 and for an incident angle $\theta_0$=45°, the 0-th order light reaches the line sensor as shown in FIG. 6A. Thus the 0-th order light aline is focused on the photosensor means 4.

When this state is taken as a reference (initial) state, the ±1st order lights are separated from the 0-th order light on the photosensor by:

$$\xi = L_0 \cdot \tan \beta_{\pm 1} \quad (4)$$

wherein $\xi$ indicates the width of separation (or amount of aberration) from the imaging position of the 0-th order light on the photosensor.

In the above-mentioned example, for an axial distance $L_0$=45 mm from the diffraction grating to the photosensor, the amounts of separation of the ±1st order light are determined, from the equation (4), as:

$$\xi_{+1}=0.242 \text{ mm}, \xi_{-1}=-0.187 \text{ mm}.$$

In the present embodiment, in the reference state shown in FIG. 6A, the green 0-th order light 6 ($\lambda_0$=530 nm) is focused on and read by the photosensor means 4.

Then, when the one-dimensional blazed diffraction grating 3 is rotated anticlockwise, in synchronization with the image scanning speed, from said reference state shown in FIG. 6A, by an angle $\gamma_{-1}$ ($\theta_0-\theta_1$) about the crossing point O of said grating and the optical axis as shown in FIG. 6B, the blue −1st order light 5 ($\lambda_{-1}$=471 nm) moves by the separation amount $|\xi_{-1}|$ and is focused on and read by the photosensor means 4.

Also when said one-dimensional blazed diffraction grating 3 is rotated clockwise, in synchronization with the image scanning speed from the reference state shown in FIG. 6A, by an angle $\gamma_{+1}$ ($\theta_0-\theta_{+1}$) about said crossing point O, the red +1st order light ($\lambda_{+1}$=606 nm) moves by the separation amount $|\xi_{+1}|$, and is focused on and read by the photosensor means.

Thus the reading of the color image on the original is achieved by separation thereof into three colored lights of R, G and B by the repetition of the above-explained reading operation, and by the superposing of thus obtained colored lights in time-sequential manner on the line sensor of the photosensor means.

The rotation angles $\gamma_{\pm 1}$ ($\gamma_{-1}=\theta_0-\theta_{-1}, \gamma_{+1}=\theta_0-\theta_{+1}$) of the one-dimensional blazed diffraction grating for the ±1st order lights are defined by:

$$\gamma_{-1}=-\beta_{-1}/2, \gamma_{+1}=-\beta_{+1}/2$$

wherein $\beta_{\pm 1}$ are separation angles. Thus, for the above-mentioned values of the separation angles $\beta_{\pm 1}$ for the ±1st order lights, there can be obtained:

$$\gamma_{-1}=+0.119 \text{ deg}, \gamma_{+1}=-0.154 \text{ deg}.$$

These are very small angles and can be easily attainable in the designing of the rotating mechanism. For example an inexpensive and simple rotating mechanism can be prepared by employing a piezoelectric device for rotating the diffraction grating.

In the present embodiment, the imaging optical system is constructed as a telecentric system at the exit side, for the following reason.

In case the incident angles of the rays entering the diffraction grating are not constant, depending on the image angles in the main scanning cross section, the blazed wavelength $\lambda_0$ varies according to the following equation:

$$m \cdot \lambda_0 = di \times \left[ \frac{1}{\cos\theta_0 \cdot \cos\alpha'} + \frac{1-\tan^2\theta_0 - (\tan\alpha'/\cos\theta_0)^2}{\{1/\cos^2\theta_0 + (\tan\alpha'/\cos\theta_0)^2\}^{1/2}} \right] \quad (5)$$

More specifically, in case an ordinary non-telecentric imaging optical system and a reflective one-dimensional blazed diffraction grating are employed for an incident angle $\alpha'$=20° in the main scanning section, the blazed wavelength $\lambda_0$ is shifted as large as about 30 nm.

In order to prevent such shifting, the present embodiment employs an exit telecentric imaging optical system, whereby the principal rays of the emerging lights of different image angles from said imaging optical system always perpendicularly enter the diffraction grating in the main scanning section.

In the present embodiment, the incident angle of the light entering the diffraction grating 3 varies slightly, because of the rotation thereof, so that the peak wavelength of the diffracted light of each order shows a certain shift.

For example, in the state shown in FIG. 6B, according to the equations (2) and (3), the 0-th order light has a wavelength $\lambda_0$=528.9 nm, the +1st order light has a wavelength $\lambda_{+1}\cong 604.4$ nm, and the −1st order light has a wavelength $\lambda_{-1}\cong 470.1$ nm.

Also in the state shown in FIG. 6C, the 0-th order light has a wavelength $\lambda_0$=531.4 nm, the +1st order light has a wavelength $\lambda_{+1}\cong 607.3$ nm and the −1st order light has a wavelength $\lambda_{-1}\cong 472.4$ nm.

However the shift in wavelength, between such rotated state and the reference state shown in FIG. 6A is only about 1.5 nm at maximum, for the light of each order. Such shift amount is within the tolerance of the color image reading device, and the influence of such shift on the color image reading is negligibly small.

Also in the present embodiment, the color image on the original is read by line scanning, in the sub scanning direction, by unrepresented scanning means provided between said color image and the imaging optical system, and so-called line-sequential scanning is attained by effecting the line stepping at each cycle of rotation ($\theta_0, \theta_{-1}, \theta_{+1}$) of the one-dimensional blazed diffraction grating.

Also so-called frame-sequential color image reading can be attained by scanning the entire image for each rotation step of the diffraction grating.

Also the present embodiment has an advantage of not requiring the color filters or the like, since the reflective one-dimensional blazed diffraction grating, employed as the color separation means, provides satisfactory spectral distribution in the separated colored lights of red, green and blue.

In the following there will be explained the features of the reflective one-dimensional blazed diffraction grating of the present embodiment, in comparison with a transmissive one-dimensional blazed diffraction grating.

As also disclosed in the aforementioned report in Applied Optics, 17, No. 15, pp. 2273–2279 (Aug. 1, 1978), the transmissive diffraction grating separates the incident light beam, by transmissive diffraction, principally into three directions. In such transmissive diffraction grating, the required grating thickness $d_T$ for the blazed wavelength $\lambda_0$ is represented by $d_T=m\cdot\lambda_0/(n_{\lambda 0}-1)$, wherein $n_{\lambda 0}$ is the refractive index of the medium. For conditions of m=2 and $\lambda_0$=530 nm as in the foregoing embodiment and for a refractive index of $n_{\lambda 0}$ of about 1.50, there will be required a thickness $d_T$=2120 nm for the transmissive diffraction grating.

On the other hand, in the reflective one-dimensional blazed diffraction grating (incident angle of 45° for the axial ray) employed in the present invention, the thickness of grating is 749.5 nm as explained above.

Consequently the transmissive diffraction grating requires a step about three times as large as that of the reflective diffraction grating.

Such larger step involves significant difficulty in the preparation of the diffraction grating. Such difficulty can be alleviated to some extent by increasing the refractive index of the medium, but the one-dimensional blazed diffraction gratings are generally made of a material of a refractive index of about 1.5, such as $SiO_2$, in consideration of the working ability and the cost.

Also in consideration of the space efficiency in the apparatus, the reflective diffraction grating is more advantageous, for example in the ease of compactization of the entire apparatus.

Figure 8:
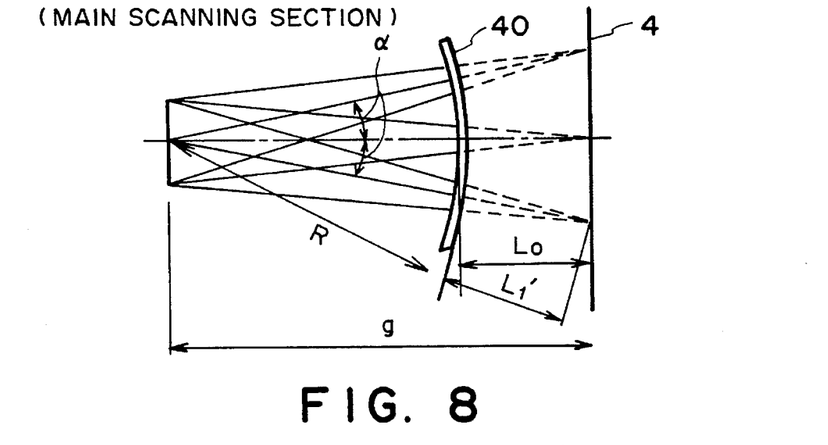
FIG. 8 is a schematic view of a second embodiment of the present invention.

FIG. 8 is a partial schematic view of the optical system of a second embodiment of the present invention. This embodiment employs an ordinary (non-telecentric) imaging optical system, by employing a cylindrical reflective diffraction grating 40 as the color separation means.

Figure 9:
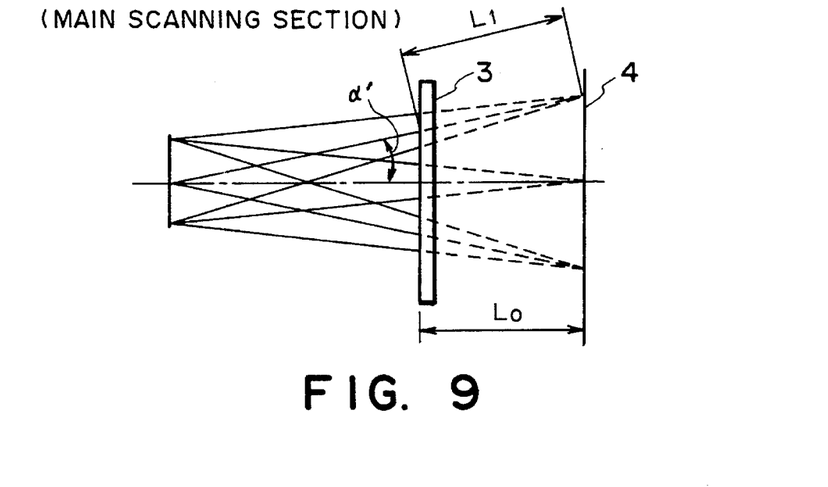
FIG. 9 is a schematic view of a configuration taken for comparison with that of the present invention.

Let us consider a case in which a ray entering with a field angle $\alpha$ emerges from the imaging optical system 2 with an angle $\alpha'$, in combination with an ordinary non-cylindrical reflective diffraction grating as shown in FIG. 9. In such case, the distance to the line sensor 4 from said diffraction grating is $L_0$ for the axial ray, or $L_1$ for an off-axis ray of an emerging angle $\alpha'$, wherein $L_1$=$L_0$/cos $\alpha'$. (It is to be noted that the optical paths are represented in developed state, indicated by broken lines. In the ordinary optical system $\alpha \cong \alpha'$.)

Consequently, the optical path length between the one-dimensional blazed diffraction grating and the photosensor varies depending on the emerging angle $\alpha'$, thus being different for the axial ray ($\alpha'$=0) and for the off-axis ray ($\alpha' \neq 0$).

In the present embodiment, in order to resolve the above-mentioned drawback, the substrate bearing the reflective one-dimensional blazed diffraction grating 40 is curved as a cylindrical face having the center at the exit pupil of the imaging optical system as shown in FIG. 8. In this manner the emerging principal ray corresponding to any image angle always perpendicularly enter the diffraction grating 40, and the shifting of the blazed wavelength dependent on the incident angle can be effectively prevented.

On the other hand, the optical path length to the line sensor 4 after reflective diffraction by said grating 40 is $L_0$=g–R for the axial ray ($\alpha'$=0) and $L_1$=g/cos $\alpha'$–R for the off-axis ray ($\alpha' \neq 0$). Because of this difference in the optical path length, the reflection diffracted light is not properly focused on the line sensor.

Figure 10:
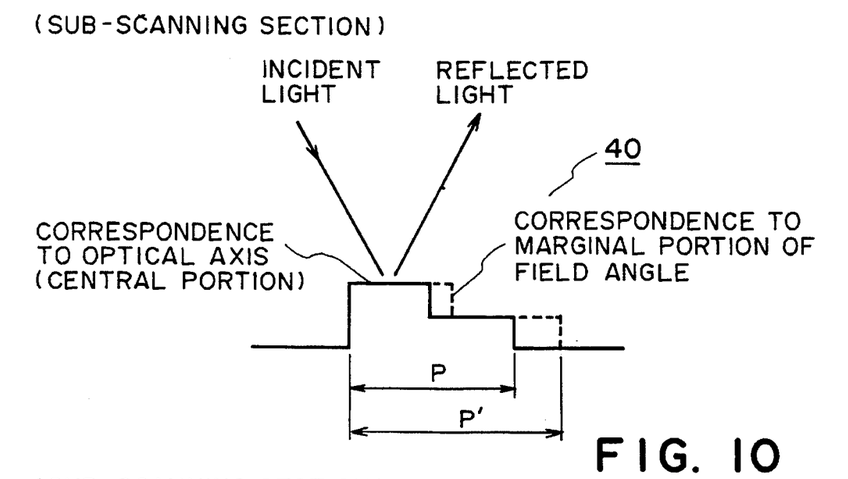
FIG. 10 is a schematic view of the diffraction grating of the second embodiment of the present invention.

In order to avoid this drawback, the grating pitch P of the reflective diffraction grating 40 is gradually increased, from P to P' in FIG. 10, in the main scanning cross section and symmetrically from the axial position of the imaging optical system to the peripheral off-axis position, according to the following equation (6).

In this manner the first-order diffraction angle is varied, and the diffracted lights are properly focused on the line sensor 4, from the axial position to the off-axis position.

The reflected diffraction angle $\theta'$ and the incident angle $\theta$ in the first-order reflective diffraction are correlated by the following equation:

$$\theta'=\sin^{-1}(\pm \lambda/P+\sin \theta) \quad (6)$$

wherein: $\lambda$: wavelength P: grating pitch +: +1st order –: 1st order.

In the present embodiment, as explained above, the reflective one-dimensional blazed diffraction grating 40 is formed in a cylindrical shape, and the pitch of said grating is suitably modified. Consequently proper color separation can be achieved even with the ordinary imaging optical system, and the color image information can be precisely read for each color.

Figure 11:
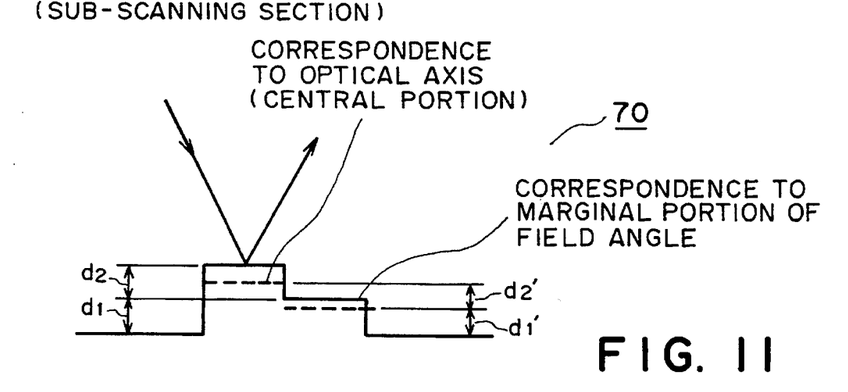
FIG. 11 is a schematic view of the diffraction grating in a third embodiment of the present invention.
Figure 12:
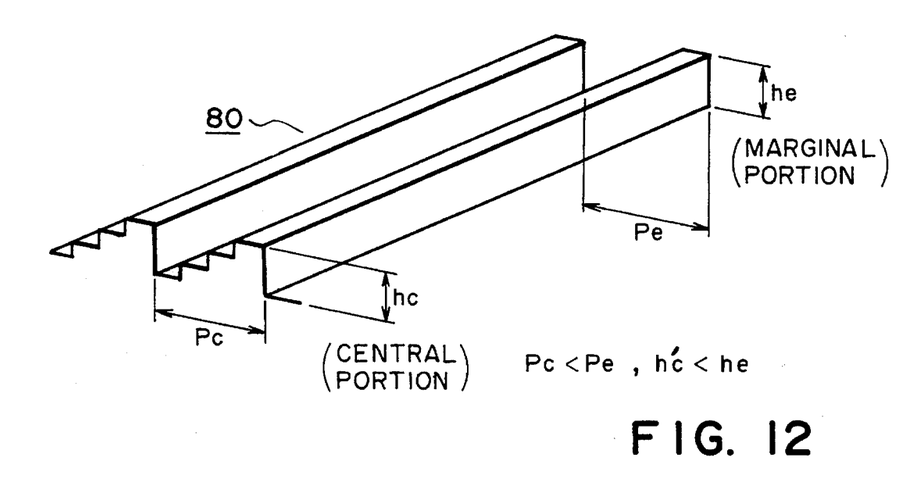
FIG. 12 is a perspective view of the diffraction grating of the third embodiment of the present invention.

FIGS. 11 and 12 are schematic view of a reflective diffraction grating employed in a third embodiment of the present invention.

In the reflective one-dimensional blazed diffraction grating 70 shown in FIG. 11, the thickness of the grating in the main scanning cross section is increased, proportionally for the steps, from the axial position to the off-axis position (from the center to the peripheral position), in order to prevent the shift in blazed wavelength, dependent on the incident angle, resulting from the flat structure of the substrate of the diffraction grating.

Also the reflective diffraction grating 80 shown in FIG. 12 has a three-dimensional structure formed on a flat substrate, wherein the grating pitch P is increased gradually in the main scanning cross section from a value Pc at the center to a value Pe at the peripheral area, and the grating thickness is continuously increase from a value hc at the center to a value he at the peripheral area.

Such diffraction grating 80 with three-dimensional structure allows to obtain a color image reading device capable of proper color separation even in combination with a non-telecentric imaging optical system.

In the above-explained embodiment, the changes in the grating pitch and in the grating thickness are assumed to be continuous, but the mode of said changes is not limited to the above-explained embodiment. For example, a similar effect can be obtained by varying said grating pitch and grating thickness in plural steps.

Also in the foregoing embodiments, the reflective one-dimensional blazed diffraction grating is rotated by predetermined amounts, but it is also possible to obtain similar effects by moving the line sensor constituting the photosensor means, by the above-mentioned separation widths $\xi_{\pm 1}$ so as to match the focus position of the colored lights separated by said diffraction grating.

Also in the foregoing description, the optical elements are so positioned that the 0-th order light is focused on the line sensor constituting the photosensor means in the reference state shown in FIG. 6A, but the position of the line sensor may be so modified that either of the ±1st order lights is focused on said line sensor.

According to the present invention, when a color image is read by a light receiving means composed of one line sensor through a rotatable reflective one-dimensional blazed diffraction grating serving as color separating means, at least three color-lights color-separated by the diffraction grating is synchronized with the scanning reading speed to rotate the diffraction grating in at least three directions, so that each color-light is successively read by the light receiving means. By such the construction according to the present invention, it is realized to provide a color image reading device capable of reading color image with high accuracy by use of only one line sensor.

Also the use of a reflective diffraction grating with a three-dimensional structure provides a color image reading device capable of utilizing a conventional optical system instead of a telecentric optical system.

What is claimed is:

1. A color image reading device comprising:

a line sensor, said line sensor comprising only a single line sensor;

an imaging optical system for focusing the image of an object on said line sensor; and a blazed diffraction grating, positioned between said imaging optical system and said line sensor, for color-separating a light from the object into plural colored lights, wherein said blazed diffraction grating is rotatable in a sub scanning direction.

2. A device according to claim 1, wherein said blazed diffraction grating is rotatable in a sub scanning cross section.

3. A device according to claim 1, wherein said blazed diffraction grating is a reflective diffraction grating.

4. A device according to claim 1, wherein said imaging optical system is telocentric at an exit side.

5. A device according to claim 1, wherein a grating pitch of said blazed diffraction grating is increased in succession from an axial center of said imaging optical system to peripheral portions in an image angle of said imaging optical system.

6. A device according to claim 1, wherein a grating thickness of said blazed diffraction grating is increased in succession from an axial center of said imaging optical system to peripheral portions in an image angle of said imaging optical system.

7. A device according to claim 1, wherein said blazed diffraction grating color-separates the light from said object into plural colors in a direction perpendicular to a direction of array of pixels of said line sensor.

8. A device according to claim 1, wherein the object is scanned in a sub scanning direction which is perpendicular to a direction of array of pixels of said line sensor.

9. A device according to claim 1, wherein said blazed diffraction grating is rotated in at least three directions.

10. A method of reading a color image, comprising the steps of:

focusing an image of an object on only a single line sensor by an imaging optical system;

arranging a blazed diffraction grating for color-separating a light from the object into plural colored lights in an optical path between the imaging optical system and the line sensor; and rotating the blazed diffraction grating so as to read the image of the object, wherein the blazed diffraction grating is rotated in a sub scanning direction.

11. A method according to claim 10, wherein the blazed diffraction grating is rotated in a sub scanning cross section.

12. A method according to claim 10, wherein the blazed diffraction grating is a reflective diffraction grating.

13. A method according to claim 10, wherein the imaging optical system is telocentric at an exit side.

14. A method according to claim 10, wherein a grating pitch of the blazed diffraction grating is increased in succession from an axial center of the imaging optical system to peripheral portions in an image angle of the imaging optical system.

15. A method according to claim 10, wherein a grating thickness of the blazed diffraction grating is increased in succession from an axial center of the imaging optical system to peripheral portions in an image angle of the imaging optical system.

16. A method according to claim 10, wherein the blazed diffraction grating color-separates the light from the object into plural colors in a direction perpendicular to a direction of array of pixels of the line sensor.

17. A method according to claim 10, wherein the object is scanned in a sub scanning direction which is perpendicular to a direction of array of pixels of the line sensor.

18. A method according to claim 10, wherein the blazed diffraction grating is rotated in at least three directions.

* * * * *

UNITED STATES PATENT AND TRADEMARK OFFICE
CERTIFICATE OF CORRECTION

PATENT NO. : 5,471,321

DATED : November 28, 1995

INVENTOR : MICHITAKA SETANI

Page 1 of 2

It is certified that error appears in the above-identified patent and that said Letters Patent is hereby corrected as shown below:

On the title page,

<u>AT [56] REFERENCES CITED</u>

Insert --OTHER PUBLICATIONS
      Color Separation Gratings, August 1, 1978,
      vol. 17, no. 15, Applied Optics--.

<u>COLUMN 1</u>

Line 57,   "prims" should read --prism--;

Line 62,   "$2\vec{\sqrt{2}X}$" should read --$\vec{\sqrt{2}X}$--.

<u>COLUMN 8</u>

Line 60,   "such the" should read --such--;
    Line 62,   "color" should read --a color--.

<u>COLUMN 9</u>

Line 20,   "telocentric" should read --telecentric--.

UNITED STATES PATENT AND TRADEMARK OFFICE
CERTIFICATE OF CORRECTION

PATENT NO. : 5,471,321

DATED : NOVEMBER 28, 1995

INVENTOR : MICHITAKA SETANI

It is certified that error appears in the above-identified patent and that said Letters Patent is hereby corrected as shown below:

<u>COLUMN 10</u>

Line 18, "telocentric" should read --telecentric--.

Signed and Sealed this

Thirtieth Day of April, 1996

Attest:

BRUCE LEHMAN

*Attesting Officer*     *Commissioner of Patents and Trademarks*